United States Patent
Kim et al.

(10) Patent No.: US 10,560,739 B2
(45) Date of Patent: *Feb. 11, 2020

(54) METHOD, SYSTEM, APPARATUS, AND NON-TRANSITORY COMPUTER READABLE RECORDING MEDIUM FOR EXTRACTING AND PROVIDING HIGHLIGHT IMAGE OF VIDEO CONTENT

(71) Applicant: NAVER Corporation, Seongnam-si, Gyeonggi-do (KR)

(72) Inventors: HanSuk Kim, Seongnam-si (KR); Byoungkwan Kim, Seongnam-si (KR); Daejin Lim, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,961

(22) Filed: Dec. 6, 2017

(65) Prior Publication Data

US 2018/0098117 A1    Apr. 5, 2018

Related U.S. Application Data

(63) Continuation of application No. 15/246,841, filed on Aug. 25, 2016, now Pat. No. 9,854,305.

(30) Foreign Application Priority Data

Sep. 8, 2015    (KR) .................. 10-2015-0127123

(51) Int. Cl.
*H04N 21/442* (2011.01)
*H04N 21/475* (2011.01)
(Continued)

(52) U.S. Cl.
CPC ....... *H04N 21/44204* (2013.01); *G11B 27/00* (2013.01); *H04N 21/23439* (2013.01);
(Continued)

(58) Field of Classification Search
CPC .......... H04N 21/44204; H04N 21/475; H04N 21/23439; H04N 21/8549; H04N 21/4825;
(Continued)

(56) References Cited

U.S. PATENT DOCUMENTS

| 9,635,400 B1 | 4/2017 | Sherrets et al. |
| 2003/0093790 A1 | 5/2003 | Logan et al. |

(Continued)

FOREIGN PATENT DOCUMENTS

| JP | 2002215917 A | 8/2002 |
| JP | 2004199547 A | 7/2004 |

(Continued)

OTHER PUBLICATIONS

Korean Office Action dated May 4, 2016, for corresponding Korean Applicayion No. 10-2015-0127123.

(Continued)

*Primary Examiner* — Oschta I Montoya
(74) *Attorney, Agent, or Firm* — Harness, Dickey & Pierce, P.L.C.

(57) ABSTRACT

Provided are a method, system, apparatus, and non-transitory computer-readable medium for extracting a highlight image of video content. A method configured as a computer includes providing video content to a client electronic device; receiving a selection on a partial section of the video content from the client electronic device; storing the selected partial section in association with the video content; and providing the stored partial section in a form of a comment on the video content.

15 Claims, 12 Drawing Sheets

(51) Int. Cl.
*H04N 21/2343* (2011.01)
*H04N 21/8549* (2011.01)
*H04N 21/482* (2011.01)
*H04N 21/24* (2011.01)
*H04N 21/466* (2011.01)
*H04N 21/25* (2011.01)
*G11B 27/00* (2006.01)

(52) U.S. Cl.
CPC ....... *H04N 21/2407* (2013.01); *H04N 21/252* (2013.01); *H04N 21/4668* (2013.01); *H04N 21/475* (2013.01); *H04N 21/4825* (2013.01); *H04N 21/4826* (2013.01); *H04N 21/8549* (2013.01)

(58) Field of Classification Search
CPC ........... H04N 21/2407; H04N 21/4668; H04N 21/252; H04N 21/4826; G11B 27/00
See application file for complete search history.

(56) References Cited

U.S. PATENT DOCUMENTS

| | | | |
|---|---|---|---|
| 2012/0117583 A1* | 5/2012 | Gunatilake | G06K 9/00744 725/19 |
| 2012/0179967 A1* | 7/2012 | Hayes | G06F 3/0484 715/719 |
| 2012/0263430 A1 | 10/2012 | Spitzer-Williams | |
| 2016/0080820 A1* | 3/2016 | Lee | H04L 51/32 725/34 |
| 2017/0032821 A1* | 2/2017 | Long | G11B 27/031 |
| 2017/0150237 A1 | 5/2017 | Minamino et al. | |

FOREIGN PATENT DOCUMENTS

| | | |
|---|---|---|
| JP | 2004350092 A | 12/2004 |
| JP | 2006352779 A | 12/2006 |
| JP | 2008172745 A | 7/2008 |
| JP | 201004309 A | 1/2010 |
| JP | 2010226630 A | 10/2010 |
| KR | 10-0827198 B1 | 5/2008 |
| KR | 2013-0125047 A | 11/2013 |
| KR | 10-1540686 B1 | 8/2015 |

OTHER PUBLICATIONS

Japanese Office Action dated Aug. 15, 2017 for corresponding Japanese Patent Application No. 2016-153637.
Japanese Office Action dated Nov. 6, 2018 for corresponding Japanese Application No. 2018-002507.

* cited by examiner

METHOD, SYSTEM, APPARATUS, AND NON-TRANSITORY COMPUTER READABLE RECORDING MEDIUM FOR EXTRACTING AND PROVIDING HIGHLIGHT IMAGE OF VIDEO CONTENT

CROSS-REFERENCE TO RELATED APPLICATION(S)

This is a continuation of U.S. patent application Ser. No. 15/246,841, which claims the benefit of priority under 35 U.S.C. § 119 to Korean Patent Application No. 10-2015-0127123 filed on Sep. 8, 2015, in the Korean Intellectual Property Office (KIPO), the entire contents of both of which are incorporated herein by reference.

BACKGROUND

Field

One or more example embodiments relate to a method, system, apparatus, and/or non-transitory computer-readable recording medium for providing a highlight section of video content.

Description of Related Art

A sudden increase in users of high-speed communication networks has brought the development of new services that utilize communication networks, as well as the development of a diverse array of service items.

SUMMARY

One or more example embodiments provide a method, system, apparatus and non-transitory computer-readable recording medium that may register a partial section extracted by a user from a video in a comment form.

One or more example embodiments also provide a method, system, apparatus and non-transitory computer-readable recording medium that may extract a highlight image from a video using a partial section registered in a form of a comment.

One or more example embodiments also provide a method, system, apparatus and non-transitory computer-readable recording medium that may extract a highlight image from a video based on accumulation information of an iterative playback section by users in the video.

One or more example embodiments also provide a method, system, apparatus and non-transitory computer-readable recording medium that may provide a preview of a highlight image with respect to a video included in a content list.

One or more example embodiments also provide a method, system, apparatus and non-transitory computer-readable recording medium that may provide a continue-to-view from an end of a full image or a highlight image of a video to another video.

According to an aspect of at least one example embodiment, there is provided a method including transmitting, using at least one processor, video content to a client electronic device, receiving, using the at least one processor, a selection of a partial section of the video content from the client electronic device, storing, using the at least one processor, the selected partial section in association with the video content, and transmitting, using the at least one processor, the stored partial section along with an embedded comment associated with the video content.

The receiving of the selection may include receiving an indication of the selection and a text input, and the storing may include storing an image corresponding to the selected partial section and text of the text input, the text being the comment.

The method may further include transmitting, using the at least one processor, at least one highlight image associated with the video content to the client electronic device, receiving, using the at least one processor, an input event corresponding to a content switch gesture from the client electronic device, and transmitting, using the at least one processor, the video content to the client electronic device as a full version of the highlight image in response to the input event.

The method may further include transmitting, using the at least one processor, at least one highlight image associated with the video content to the client electronic device, receiving, using the at least one processor, an input event corresponding to a content switch gesture from the client electronic device, and transmitting, using the at least one processor, at least one highlight image associated with a second video content to the client electronic device in response to the input event.

The method may further include transmitting, using the at least one processor, a content list including a list of a plurality of videos, including the video content, to the client electronic device. The transmitting of the content list may include the transmitting of the content list includes transmitting a preview of at least one highlight image associated with each of the plurality of videos from the content list.

The method may further include configuring, using the at least one processor, the stored partial section using an index for connecting to a playback section of the video content, and the transmitting the stored partial section includes transmitting the configured partial section.

The method may further include determining, using the at least one processor, the partial section transmitted along with the embedded comment as at least one highlight image associated with the video content based on user feedback information related to the partial section transmitted along with the embedded comment.

The method may further include extracting, using the at least one processor, at least one highlight image from the video content based on accumulation information regarding at least one of an iterative section of the video content, the iterative section being a section of the video content that has been played back using a rewind function, a captured section of the video content, the captured section being a section of the video content that has been recorded, and a shared section of the video content, the shared section being a section of the video content that has been shared by at least one client electronic device.

The method may further include determining, using the at least one processor, a ranking associated with the at least one of the highlight image and the video content based on the accumulation information.

The method may further include transmitting, using the at least one processor, the extracted highlight image to the client electronic device. The transmitting of the extracted highlight image may include recommending to the client electronic device the extracted highlight image based on accumulation information of a cluster of client electronic devices that includes the client electronic device.

According to another aspect of at least one example embodiment, there is provided a non-transitory computer-readable recording medium including computer readable instructions, which when executed, cause at least one processor to transmit video content to a client electronic device, receive a selection of a partial section of the video content from the client electronic device, store the selected partial section in association with the video content, and transmit the stored partial section along with an embedded comment associated with the video content.

According to another aspect of at least one example embodiment, there is provided a system including a memory having computer readable instructions stored thereon, and at least one processor configured to execute the computer readable instructions to transmit video content to a client electronic device, receive a selection of a partial section of the video content from the client electronic device, store the selected partial section in association with the video content, and transmit the stored partial section along with an embedded comment associated with the video content.

The at least one processor may be configured to receive the selection by receiving an indication of the selection and a text input, and store the selected partial section by storing an image corresponding to the selected partial section and the text of the text input, the text being the comment.

The at least one processor may be configured to transmit at least one highlight image associated with the video content to the client electronic device, receive an input event corresponding to a content switch gesture from the client electronic device, and transmit the video content to the client electronic device as a full version of the highlight image in response to the input event.

The at least one processor may be configured to transmit at least one highlight image associated with the video content to the client electronic device, receive an input event corresponding to a content switch gesture from the client electronic device, and transmit at least one highlight image associated with a second video content to the client electronic device in response to the input event.

The at least one processor may be configured to transmit a content list including a list of a plurality of videos, including the video content, to the client electronic device, and the transmit the content list may include transmitting a preview of at least one highlight image associated with each of the plurality of videos from the content list.

The at least one processor may be configured to configure the stored partial section using an index for connecting to a playback section of the video content, and the transmit the stored partial section may include transmitting the configured partial section.

The at least one processor may be configured to determine the partial section transmitted along with the embedded comment as at least one highlight image associated with the video content based on user feedback information related to the partial content transmitted along with the embedded comment.

The at least one processor may be configured to extract at least one highlight image from the video content based on accumulation information regarding at least one of an iterative section of the video content, the iterative section being a section of the video content that has been played back using a rewind function, a captured section of the video content, the captured section being a section of the video content that has been recorded, and a shared section of the video content, the shared section being a section of the video that has been shared by at least one client electronic device, and determine a ranking associated with the at least one of the highlight image and the video content based on the accumulation information.

The at least one processor may be configured to transmit the extracted highlight image to the client electronic device, and the transmitting the highlight image may include recommending to the client electronic device the extracted highlight image based on accumulation information of a cluster of client electronic devices that includes the client electronic device.

According to another aspect of at least one example embodiment, there is provided an apparatus including a memory having computer readable instructions stored thereon, and at least one processor configured to execute the computer readable instructions to generate a graphical user interface (GUI) including a plurality of video categories, each of the plurality of video categories associated with a content list, a plurality of video content associated with each of the plurality of content lists, each of the plurality of video content including at least one preview image associated with the video content, transmit the generated GUI to at least one electronic client device, receive a selection related to one of the plurality of video categories, configure the GUI to display the content list associated with the selected video category, receive a selection related to the at least one preview image from the at least one client device, and transmit the selected preview image to the at least one client device in response to the selection, the selected preview image including a desired portion of the video content related to the selected video category.

The at least one processor may be configured to analyze the plurality of video content associated with each of the content lists, determine a partial section of each of the plurality of video content related to the video category associated with the content list, and generate the preview image associated with the video content for the video category.

The at least one processor may be configured to analyze the plurality of video content by analyzing action, music, or dialogue of partial sections of the video content for relevance to the video category.

The at least one processor may be configured to receive user input from the at least one client device related to the at least one preview image associated with the video content, store the received user input as comment information in association with the preview image, and determine a ranking of the preview image based on the stored received user input.

According to some example embodiments, it is possible to support a comment service that is improved and/or optimized for a video by extracting a partial section selected by a user from the video content and by registering the extracted partial section and associated text information in a comment form.

Also, according to some example embodiments, it is possible to extract a highlight image from a video based on an action of a user directly consuming the video, and to automate the highlight image extraction from the video by extracting the highlight image using a partial section registered in the form of a comment embedded in the video or by extracting the highlight image based on the accumulation of information of a section played back by users in the video.

Also, according to some example embodiments, it is possible to enhance the attraction power of content and the immersion of a user by providing a preview of a highlight image with respect to a video included in a content list, and to decrease the amount of data transmitted compared to providing a full image for verifying the content. Further, it is possible to verify the content in a low specification network environment.

Also, according to some example embodiments, it is possible to consecutively verify content without using a list-based selection process by providing a continue-to-view from an end of a full image or a highlight image of a video to another video. Further, since a list-image switch is not required, it is possible to provide a quality of service (QoS) suitable for the video.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
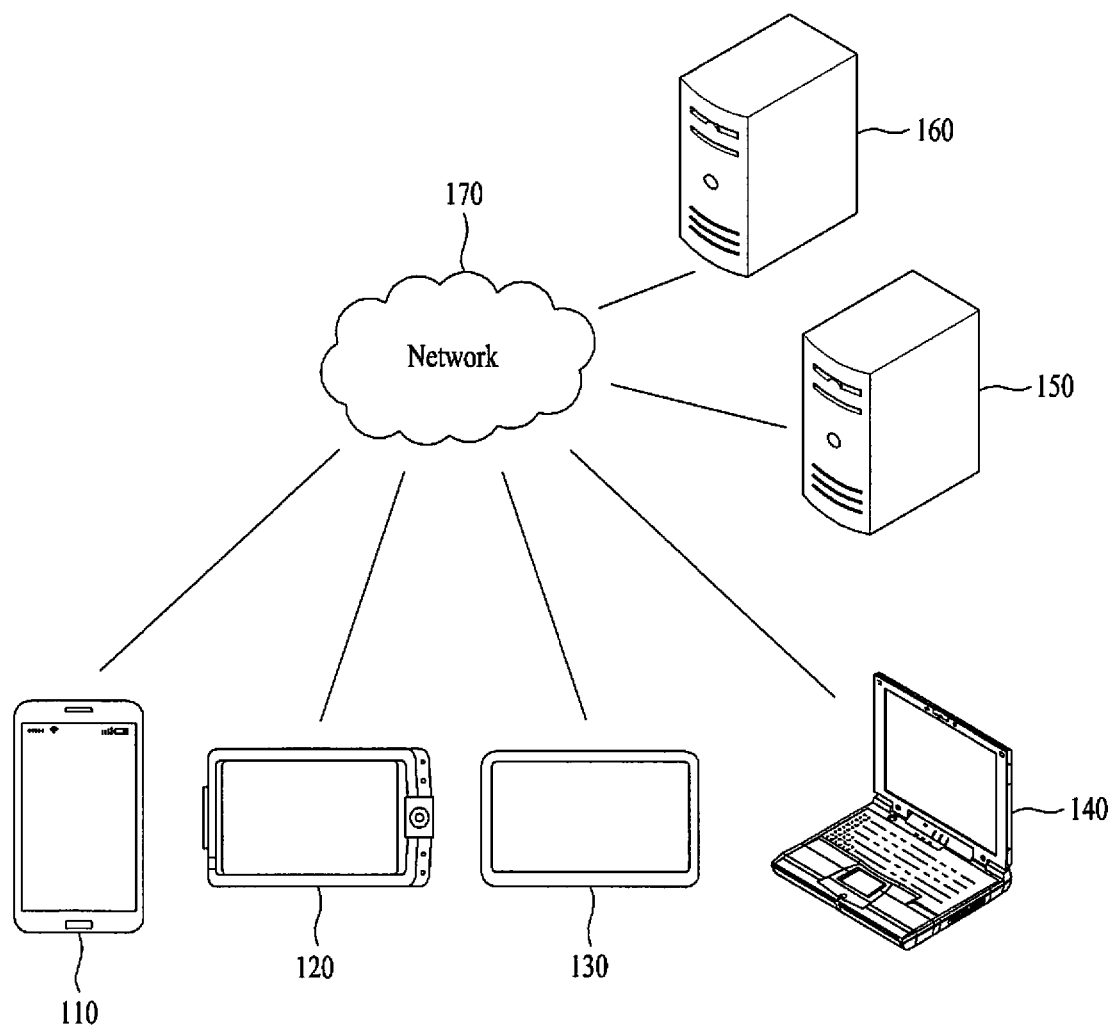
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal, or a mobile terminal, configured as a computer device. For example, the plurality of electronic devices 110, 120, 130, and 140 may be a smartphone, a mobile phone, a personal navigation device, a desktop computer, a laptop computer, a digital broadcasting terminal, a personal digital assistant (PDA), a portable multimedia player (PMP), a tablet PC, a wearable device, a smart device, an Internet of Things (IoT) device, a gaming console, a portable gaming console, a virtual reality (VR) and/or augmented reality (AR) device, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication scheme that uses near field communication, direct communication, etc., between devices as well as a communication method using a communication network, for example, a mobile communication network, the wired Internet, the wireless Internet, and a broadcasting network. For example, the network 170 may include at least one of, for example, a personal area network (PAN), a local area network (LAN), a campus area network (CAN), a metropolitan area network (MAN), a wide area network (WAN), a broadband network (BBN), the Internet, a cellular network, a satellite communication network, a radio data network, a fiber-optic network, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus, or a plurality of inter-connected computer apparatuses, that provides instructions, codes, file, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, browser or the installed application, and an operating system (OS) included in the electronic device 110. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application.

Figure 2:
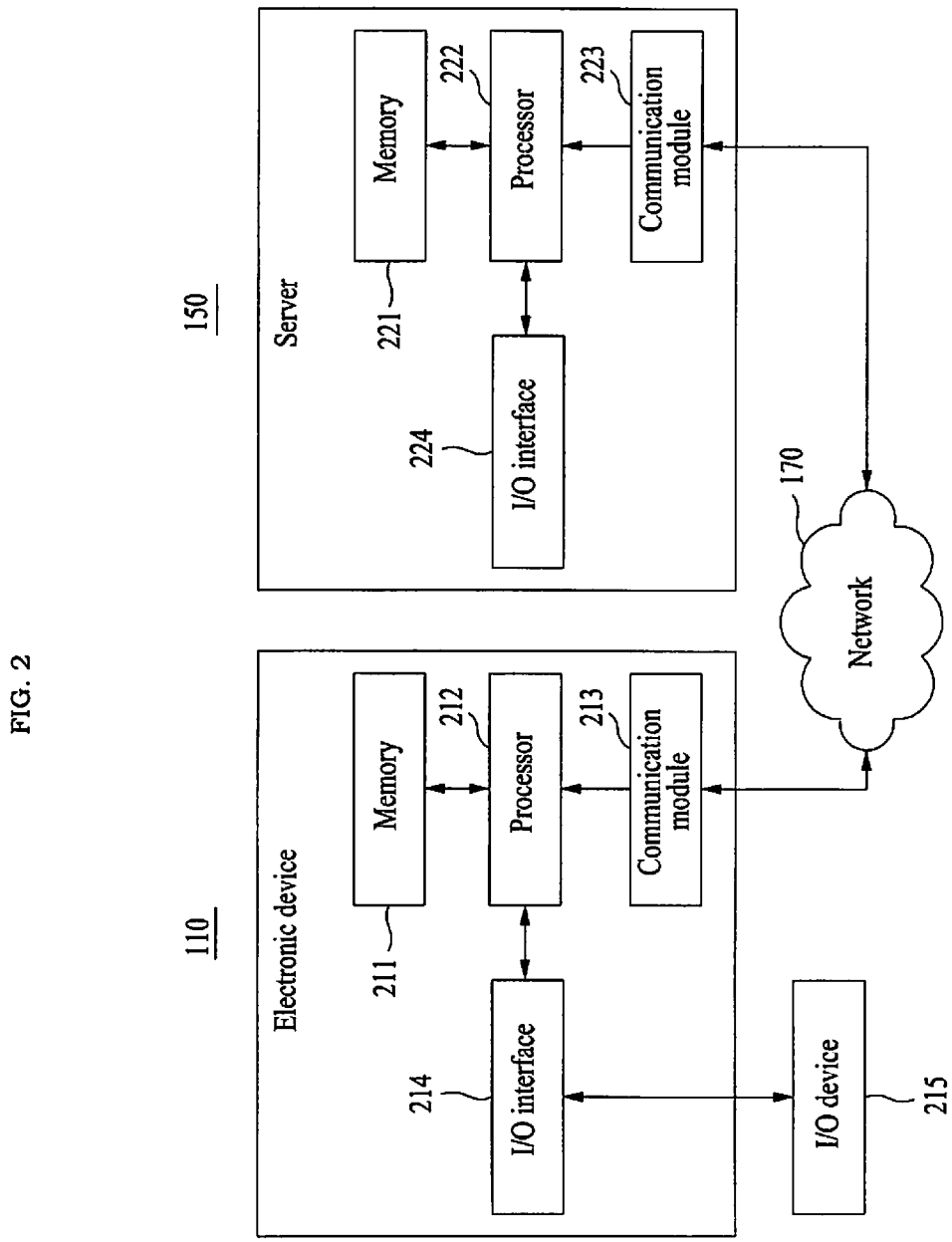
FIG. 2 is a block diagram illustrating an example of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The electronic devices 120, 130, and 140, and/or the server 160 may have the same or similar configuration to the electronic device 110 and/or the server 150.

Referring to FIG. 2, the electronic device 110 may include a memory 211, at least one processor 212 (hereafter referred to in the singular), a communication module 213, and an input/output (I/O) interface 214, and the server 150 may include a memory 221, at least one processor 222 (hereafter referred to in the singular), a communication module 223, and an I/O interface 224. The memory 211, 221 may include a permanent mass storage device, such as random access memory (RAM), read only memory (ROM), a disk drive, a solid state drive, flash memory, etc., as a non-transitory computer-readable storage medium. Also, an OS and at least one program code, for example, the aforementioned code for browser or the application installed and executed on the electronic device 110, may be stored in the memory 211, 221. Such software constituent elements may be loaded from another non-transitory computer-readable storage medium separate from the memory 211, 221 using a drive mechanism. The other computer-readable storage medium may include, for example, a floppy drive, a disk, a tape, a Blu-ray/DVD/CD-ROM drive, a memory card, etc. According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, that provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request generated based on a program code stored in the storage device such as the memory 211, to the server 150 over the network 170 under control of the communication module 213. Inversely, a control signal, an instruction, content, file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, a microphone, a camera, etc., and an output device may include a device, such as a display for displaying a communication session of an application, a speaker, a haptic feedback device, etc. As another example, the I/O interface 214 may be a device for interface with an apparatus in which an input function and an output function are integrated into a single function, such as a touch screen, etc. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like.

Figure 3:
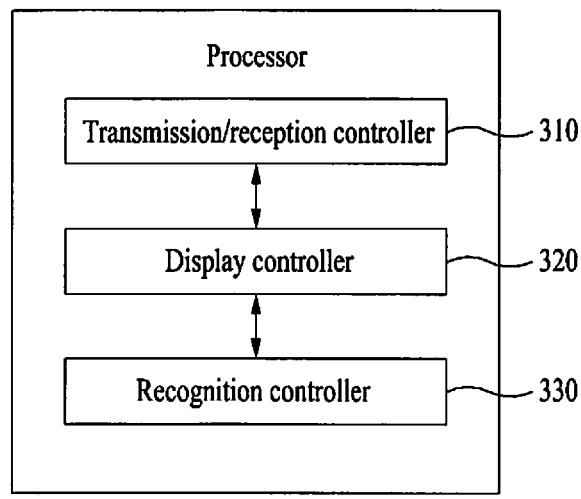
FIG. 3 is a block diagram illustrating an example of constituent elements included in at least one processor of an electronic device according to at least one example embodiment.

FIG. 3 is a block diagram illustrating an example of constituent elements included in at least one processor of an electronic device according to at least one example embodiment. Referring to FIG. 3, the processor 212 of the electronic device 110 may include a transmission/reception controller 310, a display controller 320, and a recognition controller 330 which turn the processor 212 into a special purpose processor. The constituent elements of the processor 212 may control the electronic device 110 to perform special purpose operations include in a method performed at the electronic device 110, and may be configured to execute the OS and at least one program code included in the memory 211 for such control.

Figure 4:
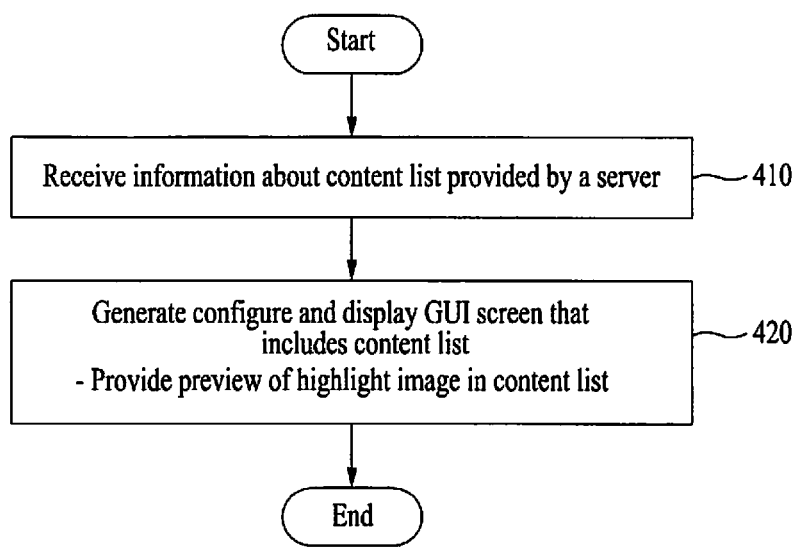
FIG. 4 is a flowchart illustrating an example of a method performed by an electronic device according to at least one example embodiment.

FIG. 4 is a flowchart illustrating an example of a method of providing a highlight image of a video in a content list using a preview according to at least one example embodiment.

In operation 410, the electronic device 110 may receive, from a content source, such as the server 150, information regarding at least one content list (e.g., a playlist, a queue, a tracklist, etc.) provided, transmitted, and/or sent from the server 150 by connecting to the server 150 over a network under control of an application executed on the electronic device 110. The application may correspond to the aforementioned at least one program code and may be provided, transmitted, and/or sent over a wireless medium and/or wireline medium. The transmission/reception controller 310 may control the electronic device 110 to perform operation 410.

In operation 420, the electronic device 110 may generate, configure, and display a graphical user interface (GUI) screen that includes the content list through the application executed on the electronic device 110 based on information about the content list provided from the server 150. The display controller 320 may control the electronic device 110 to perform operation 420.

In a related art, if a video is included in a content list, a static thumbnail or a title of a video may be provided in the content list, which may lead to the decrease of the attraction power of the content and may decrease the immersion of a user. In the related art content list, only the thumbnail or the title of the video may be verified by the user. To verify a detailed description of the video, the user is required to select the listing of the video in the content list that the user desires to verify from the content list. After selecting the listing, the user may verify a full image of the selected video that is provided in response to the selection. Thus, the related art procedure may be inconvenient to the user and the communication resource efficiency may be degraded. To outperform the above issues, the electronic device 110 may play back a highlight image and/or highlight scene (e.g., a preview scene, a representative scene, a popular scene, an exciting sequence, an interesting sequence, a noteworthy sequence, etc.) of a video included in a content list based on information about the content list provided from the server 150 and may provide a preview of the video. Here, the highlight image may be based on a partial section of the video that is extracted from the corresponding video. The partial section may be a section that is directly designated by a content provider, an editor, a user, or the like, or may be a section that is automatically extracted by the server 150. Here, the extraction of the highlight image is further described below.

Figure 5:
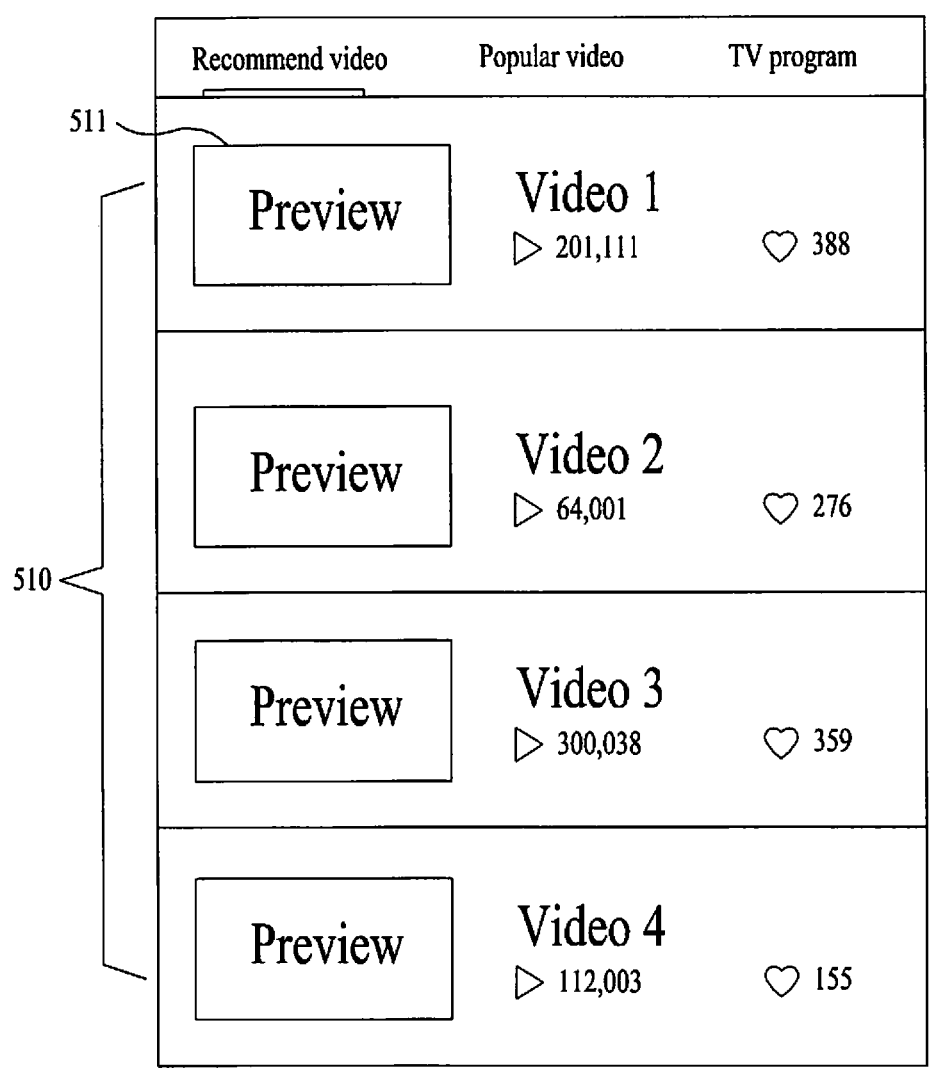
FIG. 5 illustrates an example of a graphical user interface (GUI) screen that includes a content list using a GUI screen displayed on an electronic device according to at least one example embodiment.

FIG. 5 illustrates an example of a GUI screen that includes a content list using a GUI screen 500 displayed on the electronic device 110 according to at least one example embodiment. The GUI screen 500 may be configured based on information provided by and/or transmitted from the server 150. Referring to FIG. 5, a content list 510 may include a preview area 511 for playing back a highlight image and/or highlight scene in an entry, listing, item, etc., associated with each of one or more videos included in the content list 510. Accordingly, the electronic device 110 may provide a highlight section of a video in the content list 510 as a preview, so that the user may experience the enhanced attraction power of one or more of the content and/or verify the contents without having to download and view the entire content listed in the content list 510.

Moreover, there may be a plurality of highlight sections associated with each of the videos listed in the content list

510, where each of the plurality of highlight sections may be associated with a different section of the content list 510. For example, the content list 510 may include a recommendation section (e.g., "recommended videos," etc.), a most popular section (e.g., "popular videos," popular videos based on geographic area, etc.), a content type section (e.g., "TV program," "movies," "music videos," "user generated content," "live streaming," etc.), a genre-related section (e.g., "action," "adventure," "romance," "comedy," "sci-fi," etc.), a previously watched section, etc., and there may be a different highlight section associated with a video based on which section is selected by the user. According to at least one example embodiment, if a first video (e.g., "Video 1") is listed under the "recommended video" section, the "romance" section, and the "sci-fi" section, the video may have a first highlight section that is configured to be displayed on the GUI screen 500 when the "recommended video" section is selected and/or displayed, the highlight scene depicting a highlight scene that is associated with the user's observed, collected and/or otherwise determined interests, tastes, etc., based on the user's previous viewing habits, web history, search history, purchase history, etc. The video may also have a second highlight section that is configured to be displayed on the GUI screen 500 when the "romance" section is selected and/or displayed, the highlight scene depicting a highlight scene that is associated with a romantic scene in the video that may be determined by a user, an editor, and/or automatically determined based on an analysis of the action (e.g., through object detection algorithms, action detection algorithms, etc.), music, and/or dialogue of the video. The video may also have a third highlight section that is configured to be displayed on the GUI screen 500 when the "sci-fi" section is selected and/or displayed, the highlight scene depicting a highlight scene that is associated with a sci-fi genre type (e.g., a scene involving robots, spaceships, aliens, etc.) in the video that may be determined by a user, an editor, and/or automatically determined based on an analysis of the action (e.g., through object detection algorithms, action detection algorithms, etc.), music, and/or dialogue of the video.

Figure 6:
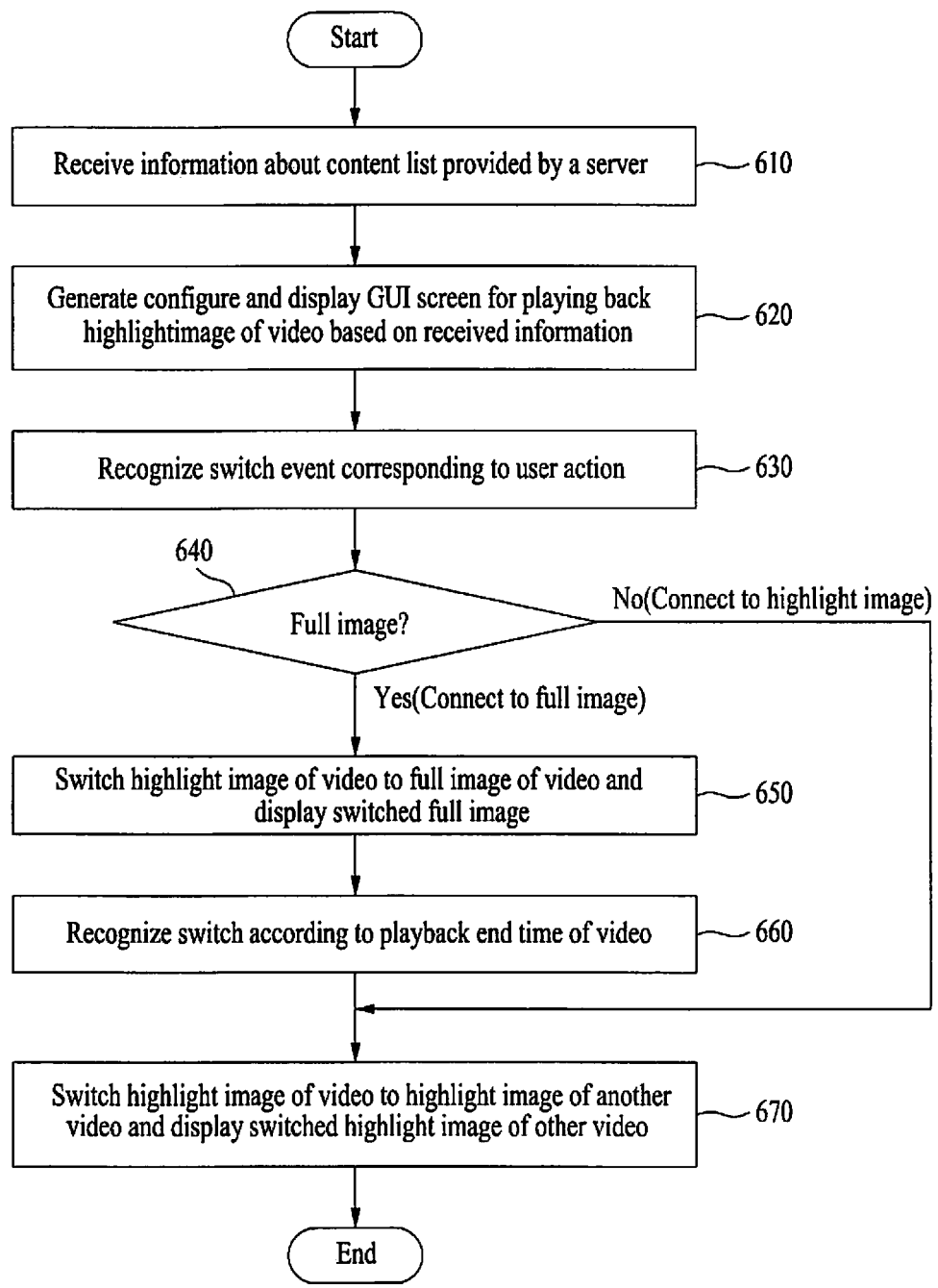
FIG. 6 is a flowchart illustrating another example of a method performed by an electronic device according to at least one example embodiment.

FIG. 6 is a flowchart illustrating an example of a screen switching method between videos according to at least one example embodiment.

In operation 610, the electronic device 110 may receive, from the server 150, information about at least one video provided by and/or transmitted from the server 150. The electronic device 110 may be connected to the server 150 over a network while under the control of an application executed on the electronic device 110. The transmission/reception controller 310 may control the electronic device 110 to perform operation 610.

In operation 620, the electronic device 110 may generate, configure, and display a GUI screen (hereinafter, a highlight image screen) for playing back a highlight image of the video through the application executed on the electronic device 110 based on information about the corresponding video provided by and/or transmitted from the server 150. The display controller 320 may control the electronic device 110 to perform operation 620. Here, the highlight image may indicate a partial section extracted from the corresponding video, and may be a section directly designated by a content provider or a section automatically extracted by the server 150. Extracting of the highlight image will be further described below.

In operation 630, the electronic device 110 may recognize a switch event (e.g., an event that triggers a switch and/or transition in one or more videos being displayed and/or played on a GUI screen) corresponding to a user action on the highlight image screen. The recognition controller 330 may control the electronic device 110 to perform operation 630. For example, the electronic device 110 may generate an input event desired and/or predefined for a corresponding gesture in response to an input of a touch-based gesture on the highlight image screen. For example, a left/right (horizontal) swipe gesture may be defined as a highlight image switch gesture for switching a screen between videos and a up/down (vertical) swipe gesture may be defined as a full image switch gesture for switching a screen between the highlight image and a full image of the video, etc., however the switch gestures and/or switch events are not limited thereto.

In operation 640, the electronic device 110 may verify whether the event recognized in operation 630 is an input event by the full image switch gesture, the highlight image switch gesture, etc. The recognition controller 330 may control the electronic device 110 to perform operation 640.

In operation 650, when the event recognized in operation 630 is the input event by the full image switch gesture, the electronic device 110 may switch the highlight image screen to a screen (hereinafter, a full image screen) for displaying the full image of the video and may display the switched full image screen. The display controller 320 may control the electronic device 110 to perform operation 650. For example, a highlight image and a full image may be configured as a single panel and a screen switching may be performed in a flip form (e.g., the highlight image and the full image may switch positions on the screen), the highlight image or the full image may be configured to be maximized on the screen, at least one of the images may be the focus of the screen, etc.

In operation 660, the electronic device 110 may recognize a switch event as occurring when the playback end time (e.g., an end page) is reached, for example when the display controller 320 is displaying the selected image in the full image mode on the full image screen. The recognition controller 330 may control the electronic device 110 to perform operation 660.

In operation 670, when a switch event, such as the switch event according to the playback end time of the full image or the input switch event such as the highlight image switch gesture, is recognized in operation 660, the electronic device 110 may switch the highlight image screen to a highlight image screen for playing back a highlight image of another video and may display the switched highlight image screen. The display controller 320 may control the electronic device 110 to perform operation 670.

Figure 7:
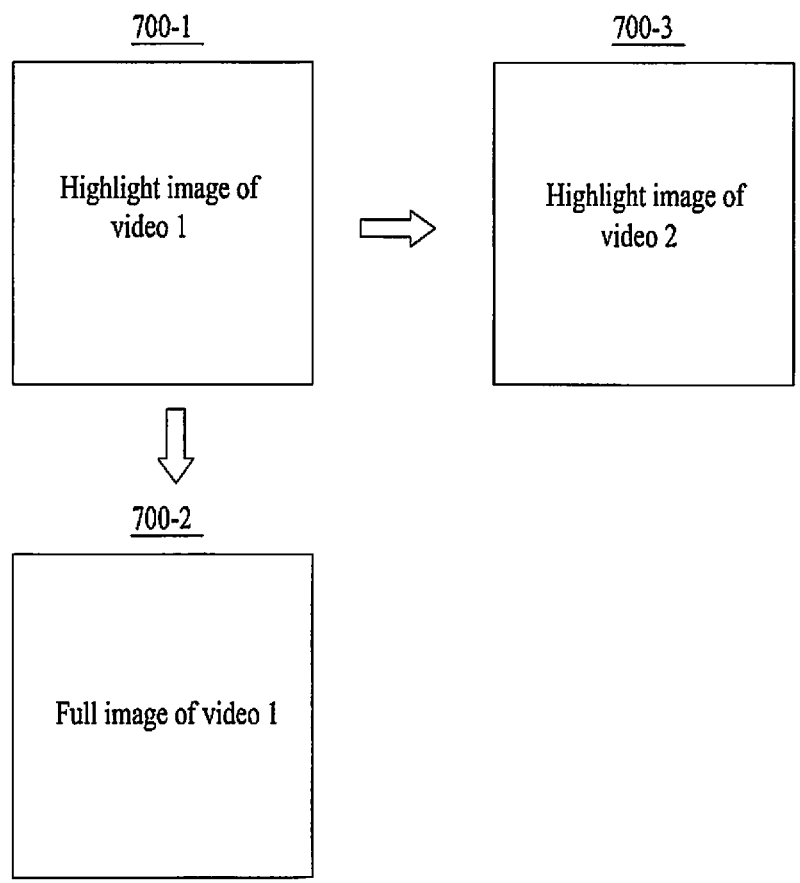
FIG. 7 illustrates an example of a screen switching process using a GUI screen displayed on an electronic device according to at least one example embodiment.

FIG. 7 illustrates an example of a screen switching process using a GUI screen displayed on the electronic device 110 according to at least one example embodiment. Screens 700-1, 700-2, and 700-3 of FIG. 7 may be configured based on information provided from the server 150.

For example, referring to FIG. 7, the electronic device 110 may display a highlight image screen 700-1 for playing back a highlight image of video 1, and may switch the highlight image screen 700-1 to a full image screen 700-2 for playing back a full image version of the video (e.g., the original version of the video, the full length version of the video, etc.) of the video (e.g., video 1, etc.) in response to an input of a up/down (vertical) swipe gesture on the highlight image screen 700-1. Here, the highlight image screen 700-1 of the video 1 and the full image screen 700-2 of the video 1 may be configured as a single panel and a flip animation may be applied to the single panel in response to the switching between screens. As another example, in response to an input of a swipe gesture from left to right on the highlight image screen 700-1 of the video 1, the electronic device 110 may switch the highlight image screen 700-1 to a highlight image screen 700-3 for playing back a highlight image of video 2.

As a further example, if the play back of the full image is terminated on the full image screen 700-2 of the video 1 (e.g., the end page has been reached), the electronic device 110 may switch to the highlight image screen 700-3 for playing back the highlight image of the next video, such as video 2. As another example, if the play back of the highlight image is terminated on the highlight image screen 700-1 of a video, such as video 1, the electronic device 110 may switch to the full image screen 700-2 for playing back the full image version of the video 1, or may switch to the highlight image screen 700-3 for playing back the highlight image of the next video in the content list, e.g., video 2. As another example, in response to an input of a left/right (horizontal) swipe gesture on the full image screen 700-2 of the video 1, the electronic device 110 may switch to a full image screen (not shown) for playing back a full image (e.g., the original version, the full version, the expanded version, etc.) of the video 2.

The video 1 and the video 2 are included in a content list provided by and/or transmitted from the server 150, and the electronic device 110 may process screen switching between videos based on an order (e.g., sorted, randomized, etc.) of the content list. The server 150 may store in memory the full image version of the videos on the content list, the highlight image version of the videos on the content list before being transferred to the electronic device 110. The content may be fully downloaded onto the electronic device 110 and/or may be streamed to the electronic device 110, from the server 150. Additionally, the content list may be stored on the electronic device 110 and/or on the server 150.

The gestures for screen switching, a screen switching order, etc., are provided as examples only and may be modified. For example, although an up/down (vertical) swipe gesture is described as an example of a full image switch gesture, switching to a full screen image may be performed in response to other gestures and/or user input commands, for example, a pinch, a double click, a drag, a voice command, a typed command, etc., on the GUI screen associated with the example embodiments, such as the highlight image screen. Further, a new event function may be introduced by recognizing a touch strength, for example, a force touch or the like, a touch time, a touch length, etc., applied on a screen. For example, switching to another category may be controlled in response to an input of a long swipe on a highlight image or a full image, etc.

Accordingly, the electronic device 110 may provide consecutive screen switching between videos by switching a highlight image screen of a video to a highlight image screen of another video through a simple gesture on the highlight image screen of the video. The electronic device 110 may assist a user for selection of content by showing a partial section of a video associated with a highlight image.

Figure 8:
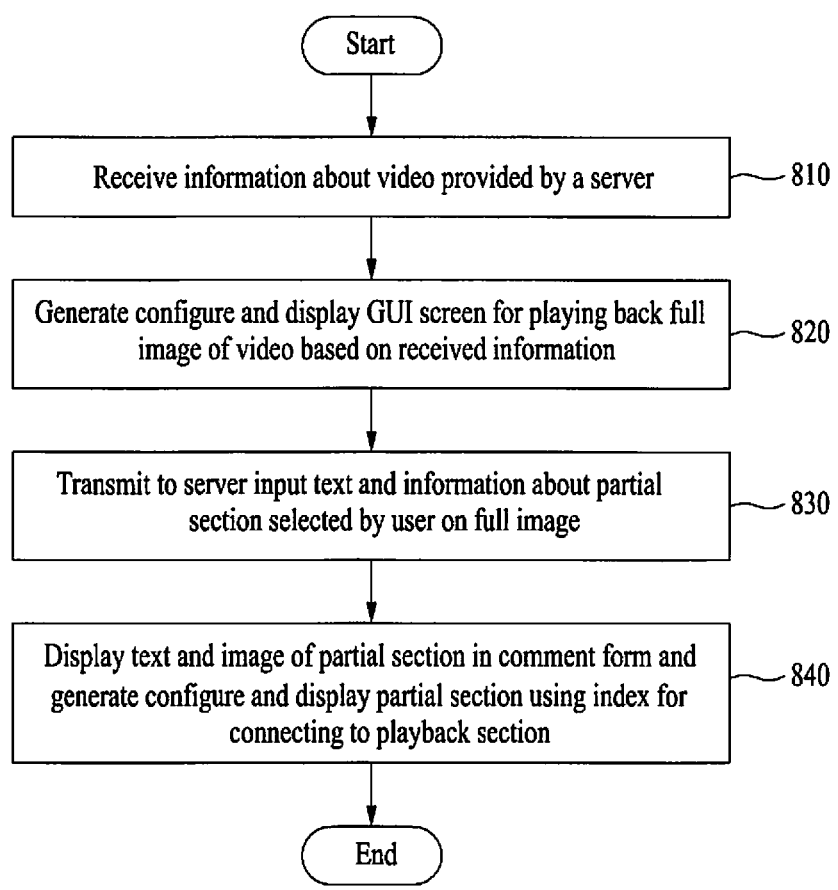
FIG. 8 illustrates another example of a flowchart illustrating a method performed by an electronic device according to at least one example embodiment.

FIG. 8 is a flowchart illustrating an example of a method of inputting a comment on a video according to at least one example embodiment.

In operation 810, the electronic device 110 may receive, from the server 150, information about a video provided from the server 150 by connecting to the server 150 over a network. The electronic device 110 may be under the control of an application executed on the electronic device 110. The transmission/reception controller 310 may control the electronic device 110 to perform operation 810.

In operation 820, the electronic device 110 may configure and display a GUI screen (hereinafter, a full image screen) for playing back a full image of the video through the application executed on the electronic device 110 based on information about the video provided from the server 150. The display controller 320 may control the electronic device 110 to perform operation 820.

In operation 830, the electronic device 110 may transmit, to the server 150, information about a partial section selected by the user from the full image and a text input from the user. The transmission/reception controller 310 may control the electronic device 110 to perform operation 830. A comment input environment (e.g., a user input GUI section) may be provided to the user viewing the video on the full image screen. For example, the full image screen may include a section selection user interface for selecting a partial section from a video. The full image screen may also include a user input user interface for inputting data that includes text, images (e.g., video clips, GIFs, stickers, photos, emojis, etc.), audio files, etc. If the user desires to post an opinion, review, comments, likes, favorite, etc., on the video while viewing the video, the user may select a partial section from the video through the section selection user interface and may input their opinion, review, comments, likes, favorite, etc., on the selected partial section as a user input, such as a text, an image (including user created videos, GIFs, stickers, photos, emojis, etc.), audio files, etc., through the user input user interface.

As another example, the electronic device 110 may automatically extract, from a video, a partial section around a point in time at which the user input user interface is activated (e.g., a case in which a cursor is created on a text input box, or a keypad is activated, etc.,) while the video is being played back, instead of separately configuring the section selection user interface, and may designate the extracted partial section as a comment input section of the user. As another example, if the user desires to post an opinion, review, comment, photo, etc., while viewing a video, the user may pause the play back of the video, and while the video is in the pause state, input a text, etc., through the user input user interface. In this case, the user may extract a partial section around a paused point in time as a comment input section of the user.

Accordingly, the electronic device 110 may support an environment for extracting a partial section on which the user desires to post an opinion or the like in the video and creating a comment that includes, for example, a text and an image of the extracted partial section.

The server 150 may collect and register comments, for example, comments each in a form that includes text, images, videos, audio, etc., and an image of a partial section, from users that view the video. The server 150 may provide at least a portion of the registered comments to the electronic device 110.

In operation 840, the electronic device 110 may display a comment of the video, for example, a comment that includes a text and an image of the partial section on the full image screen based on information about the comment provided from the server 150. The display controller 320 may control the electronic device 110 to perform operation 840. As another example, the electronic device 110 may configure and display a partial section registered in a form of a comment of a video, using an index for connecting to a playback section of the corresponding video. The full image screen may include a progress bar for controlling a playback section of a video. Here, a partial section registered in a form of a comment of the video may be used as an index that is included in the progress bar.

Figure 9:
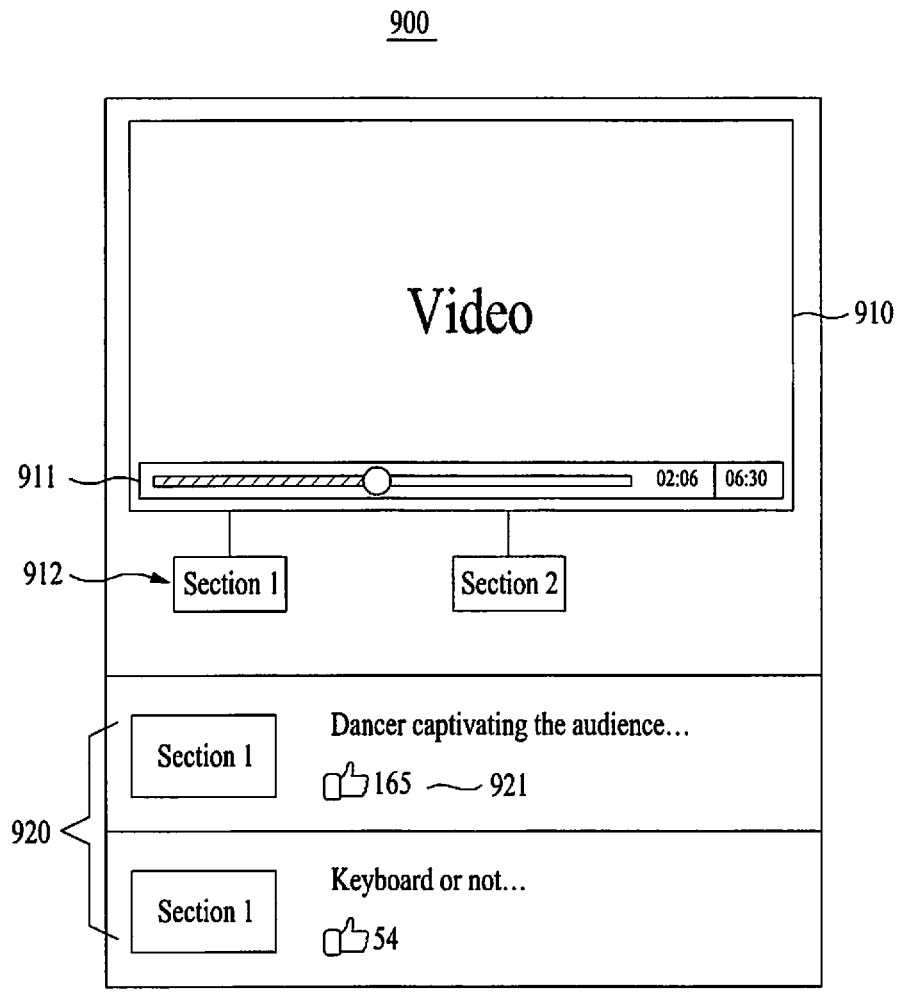
FIG. 9 illustrates an example of a screen that includes a comment list using a GUI screen displayed on an electronic device according to at least one example embodiment.

FIG. 9 illustrates an example of a screen for displaying a comment of a video using a screen 900 displayed on the electronic device 110 according to at least one example embodiment. FIG. 9 illustrates a full image screen 910 for playing back a full image of a video. The screen 900 may be configured based on information provided by and/or transmitted from the server 150.

Referring to FIG. 9, the electronic device 900 may display the full image screen 910 of the video and a comment list 920 registered in association with the video. Here, at least a portion of the comments included in the comment list 920 may be configured to include a text (and/or other user input) and a partial section of the video. The electronic device 110 may include a progress bar 911 for controlling a playback section of the video on the full image screen 910. Here, the progress bar 911 may include an index 912 for connecting to a playback section of the video, and a partial section registered in a form of a comment of the video may be configured using the index 912 for connecting to a playback section. If section 1 and section 2 are partial sections of the video that are registered in the form of comments (e.g., comments have been created in association with the video at a first and second playback section), the comment list 920 may be displayed using the one or more indices 912 for connecting to a playback section. If the user selects the section 2 among the one or more indices 912 included in the progress bar 911, the user may immediately connect to the section 2. The electronic device 110 may transfer, to the server 150, information about the section 2 connected using the index 912. The server 150 may collect information about a frequent playback section in the video and may extract a highlight section from the video based on the collected information. The extraction of a highlight section will be described below.

The comment list 920 may include an interaction button 921 for inputting an intention, for example, love, like, hate, favorite, block, etc., on a comment. Comments may be sorted on the comment list 920 from latest to oldest, or oldest to latest, etc., based on a rating of the comment (e.g., the number of positive intentions, feelings, etc., received), etc. The user may input an intention on a specific comment using the interaction button 921 while viewing comments of the video, and the electronic device 110 may transfer a user feedback using the interaction button 921 to the server 150. The server 150 may collect user feedback information, for example, accumulation information about the intentions, feelings, etc., of users, about each of comments registered to the video, and may extract a highlight image from the video based on the user feedback information. Extraction of a highlight image will be described below.

Figure 10:
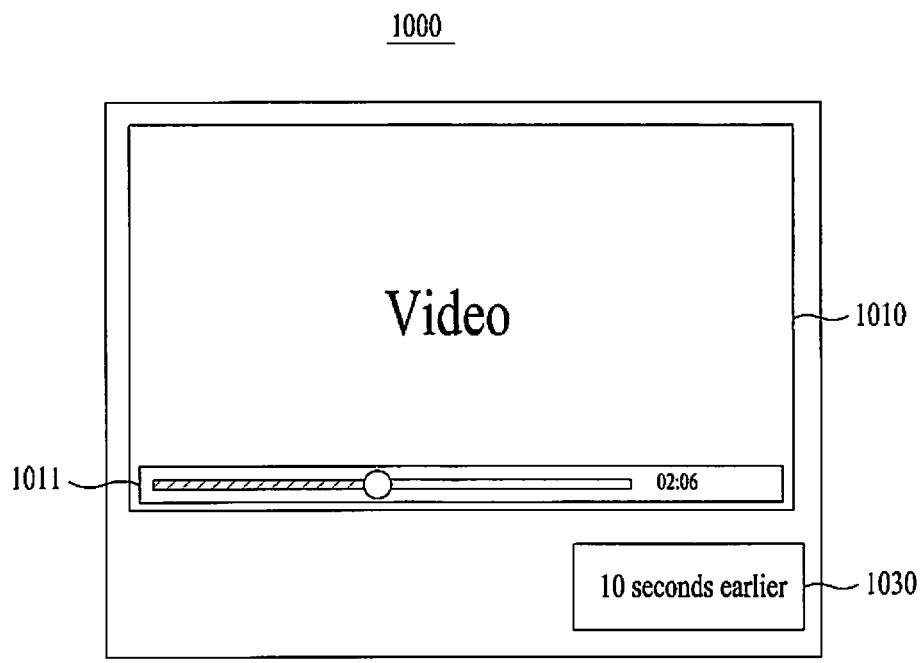
FIG. 10 illustrates an example of a screen that includes a rewind button using a GUI screen displayed on an electronic device according to at least one example embodiment.

FIG. 10 illustrates an example of a GUI screen that includes a rewind button using a screen 1000 displayed on the electronic device 110 according to at least one example embodiment. The screen 1000 may be configured based on information provided from the server 150. FIG. 10 illustrates a full image screen 1010 for playing back a full image of a video.

Referring to FIG. 10, the electronic device 110 may include a progress bar 1011 for selecting a playback section of the video and a rewind button 1030 for automatically fast-forwarding a playback section of the video by each desired (or, alternatively, preset) section, for example, 10 seconds, on the full image screen 1010. A user may view a previous image using the progress bar 1011 or the rewind button 1030 while viewing the video. The electronic device 110 may transfer information about a section connected using the rewind button 1030 or the progress bar 1011 to the server 150. The server 150 may collect information about a frequent playback section in the video (e.g., a section that has been frequently played by the user, and/or has been frequently played by a plurality of users, etc.) and may extract a highlight image from the video based on the collected information. Extraction of a highlight image will be described below.

Figure 11:
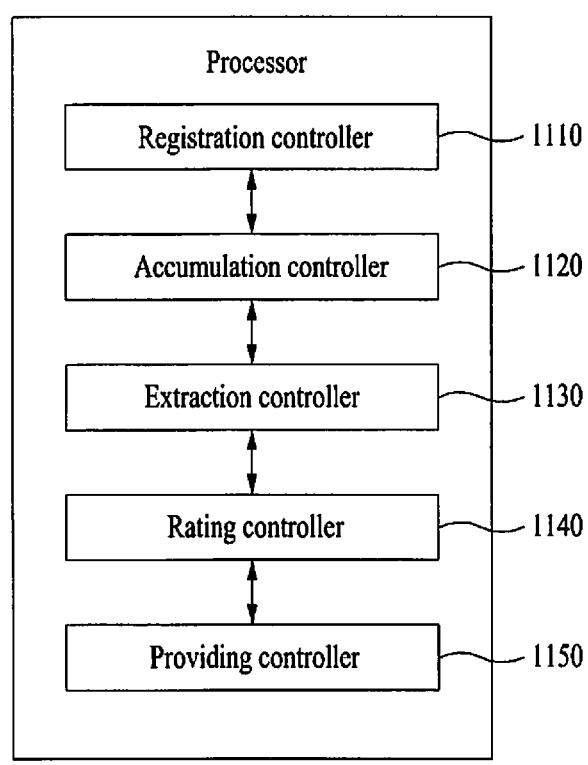
FIG. 11 is a block diagram illustrating an example of constituent elements included in at least one processor of a server according to at least one example embodiment.

FIG. 11 is a block diagram illustrating an example of constituent elements included in at least one processor of a server according to at least one example embodiment. Referring to FIG. 11, the processor 222 of the server 150 may be a special purpose processor that includes a registration controller 1110, an accumulation controller 1120, an extraction controller 1130, a rating controller 1140, and/or a providing controller 1150. The constituent elements of the processor 222 may control the server 150 to perform operations included in a method performed at the server 150 and may be configured to execute at least one program code and an OS included in the memory 221.

Figure 12:
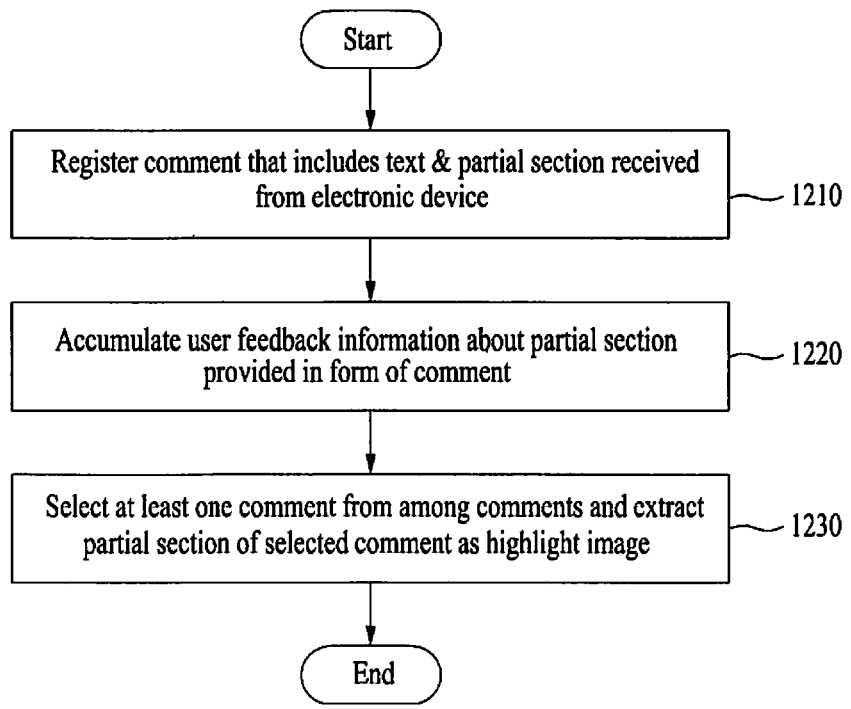
FIG. 12 is a flowchart illustrating an example of a method performed by a server according to at least one example embodiment.

FIG. 12 is a flowchart illustrating an example of a method performed by a server according to at least one example embodiment.

In operation 1210, the server 150 may receive, from at least one electronic device, a comment on a video that includes a text (and/or other user input) and a partial section of the video input into the electronic device by a user and may register the received comment, e.g., the text and partial section, in the form of the comment of the video. The registration controller 1110 may control the server 150 to perform operation 1210.

The server 150 may provide the video (e.g., may download and/or stream the video) to the electronic device in response to a request for the video from the electronic device over a network, and may support a comment input environment as discussed above. Accordingly, the electronic device may extract a partial section in which the user desires to leave a comment on the video and may transfer the extracted partial section and the user input (e.g., text input, etc.) from the user to the server 150. When providing, transmitting, and/or sending the video to the electronic device, the server 150 may also provide the comment registered to the video to the electronic device. The video and comment may be provided, transmitted, and/or sent over a wireless medium and/or wireline medium. Here, the comment may include the text and an image of the partial section, but is not limited thereto. The providing controller 1150 may control the server 150 to provide the video and information about the video to the electronic device.

In operation 1220, the server 150 may accumulate user feedback information about the partial section provided in the form of the comment of the video, based on information received from the electronic device of the user consuming the video. The accumulation controller 1120 may control the server 150 to perform operation 1220. For example, the server 150 may calculate a number of accumulated intentions, for example, a number of likes, etc., input in association with a comment of a video from users consuming the video. As another example, when a partial section registered in a form of a comment of a video is used as an index for connecting to a playback section, the server 150 may calculate a number of accumulations of the partial section selected as the index.

In operation 1230, the server 150 may select at least one comment from among comments registered to the video based on user feedback information accumulated for each comment of the video, and may extract a partial section corresponding to the selected comment as a highlight image. The extraction controller 1130 may control the server 150 to perform operation 1230. For example, the server 150 may select a comment, for example, a best comment, corresponding to a largest number of accumulated intentions from users from among comments registered to the video and may select a partial section corresponding to the selected comment as the highlight image of the video. As another example, the server 150 may select, from among partial sections registered in the form of comments, a partial section most frequently selected by users using an index for connecting to a playback section of the video as the highlight image of the video. Additionally, based on an analysis of the comments (e.g., text analysis, analysis of the user demographics (e.g., sex, age, location information of the commenter, etc.) the server 150 may select a partial section as being associated with a certain category or type, such as being funny, romantic, action packed, scary, popular with men or women, popular with children or adults, etc., and may associate the section with a content list (or content list section) that corresponds to that genre type and/or category.

Accordingly, the server 150 may support an environment for extracting a partial section in which the user desires to post an opinion while viewing the video, and creating a comment that includes, for example, a text and an image of the extracted partial section. Further, the server 150 may select a comment corresponding to a largest number of intentions input from users or a comment frequently selected using an index for connecting to a playback section from among comments registered to the video, etc., and may automatically extract an image section corresponding to the selected comment as a highlight image of the video.

Figure 13:
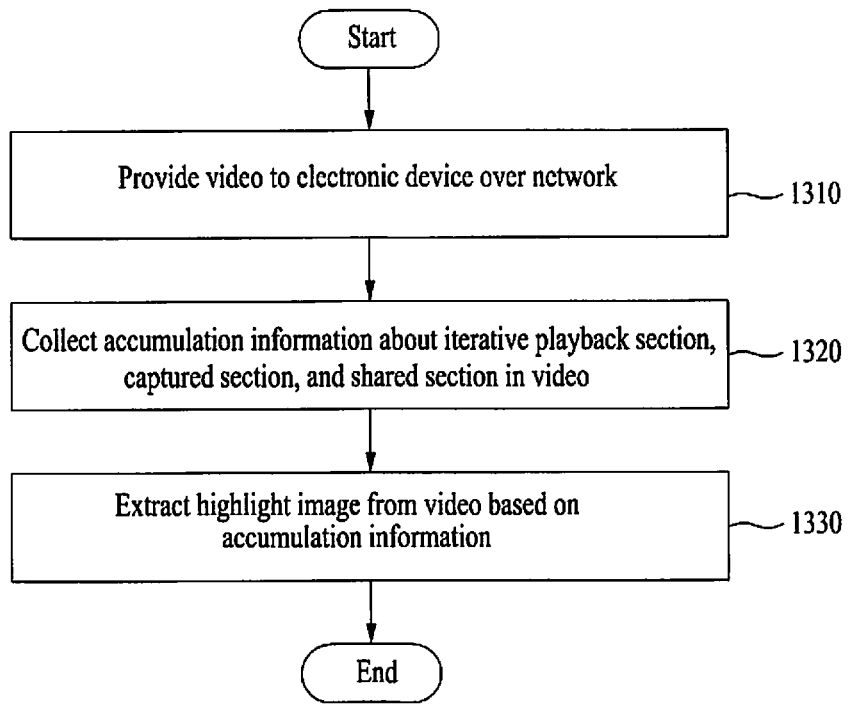
FIG. 13 is a flowchart illustrating another example of a method performed by a server according to at least one example embodiment.

FIG. 13 is a flowchart illustrating another example of a method performed by a server according to at least one example embodiment.

In operation 1310, the server 150 may provide a video to an electronic device in response to a request for the video transmitted from the electronic device over a network. The video may be provided, transmitted, and/or sent over a wireless medium and/or wireline medium. The providing controller 1150 may control the server 150 to perform operation 1310. The server 150 may support a function of fast-forwarding to a desired and/or preset point in time and playing back a corresponding playback section using a progress bar, a rewind user interface, etc., on a screen for playing back the video, a function of capturing a partial section of the video, a function of sharing a partial section of the video, and the like.

In operation 1320, the server 150 may collect accumulation information about at least one of an iterative playback section using a rewind function, a captured section, a shared section in the video, etc., based on information received from the electronic device of the user consuming the video. The accumulation controller 1120 may control the server 150 to perform operation 1320. For example, the server 150 may accumulate a number of iterative playbacks, a number of captures, a number of shares, etc., by users consuming the video, for each unit scene, for example, frame, of the video. The number of iterative playbacks may be accumulated as a valid value if a playback occurs during a desired and/or preset period of time, for example, 1 second, or more at a point in time at which a forward is made using a rewind button, a progress bar, etc.

Figure 14:
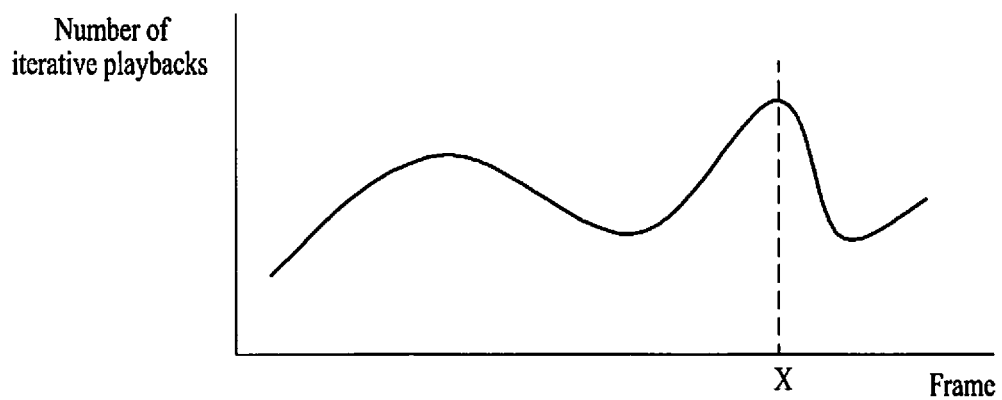
FIG. 14 is a graph showing an example of a highlight image extraction criterion according to at least one example embodiment.

In operation 1330, the server 150 may extract at least one highlight image from the video based on accumulation information associated with the video. The extraction controller 1130 may control the server 150 to perform operation 1330. For example, the server 150 may extract a highlight image of the video based on a section most frequently iteratively played back a section most frequently captured, a section most frequently shared by users that have actually consumed the video, etc. Referring to FIG. 14, a number of iterative playbacks may be accumulated for each frame. A desired (or, alternatively, predetermined) section, for example, a section from X−5 seconds to X+5 seconds around or a desired (or, alternatively, predetermined) section, for example, a section from X to X+10 seconds after a frame X corresponding to a largest number of accumulated iterative playbacks, etc., may be extracted as a highlight image. As another example, the server 150 may extract at least one section around a frame corresponding to a number of iterative playbacks greater than or equal to a set level as a highlight image. As another example, the server 150 may accumulate a number of iterative playbacks for each frame and may extract a still image of the frame X corresponding to the largest number of accumulated iterative playbacks as the highlight image. Here, the extracted highlight image may be used as a representative image of the video, such as a thumbnail, etc. Although a peak value of a number of accumulations for each frame is described as a criterion for extracting a highlight image, it is only an example and is not limited thereto. A highlight image may be extracted based on an average value, an integral value, etc., with respect to the number of accumulations for each section.

The server 150 may support a rewind function, a capture function (e.g., a record function), a share function, and the like, with respect to the video. Through this, the server 150 may automatically extract a highlight image using an iterative playback section, a captured section, and a shared section, etc., by users that have consumed the video. That is, the server 150 may extract the highlight image from the video based on content use patterns of users that have actually consumed the video.

Also, the server 150 may provide an environment in which, if a tag is inserted into each section corresponding to a highlight image and the user selects the tag, the user may immediately connect to the highlight image in which the tag is inserted. Accordingly, the server 150 may collect accumulation information for each tag and may extract the highlight image based on the accumulation information.

Further, the server 150 may automatically determine a ranking of a video based on accumulation information, for example, a number of iterative playbacks, a number of captures, a number of shares, etc., associated with the video. The rating controller 1140 may control the server 150 to perform a video rating automation. For example, the server 150 may sum up all of accumulation information for each section of a video and may determine rankings between videos based on the sum. As another example, the server 150 may determine rankings between videos based on a largest value of accumulation information for each section of a video. As another example, if a plurality of highlight images is extracted from a single video, the server 150 may compare accumulation information for each section between the plurality of highlight images and may determine rankings between the plurality of highlight images. In addition, the server 150 may determine rankings between videos or between highlight images using a content comparison result by applying an A/B testing method to a video or a highlight image. However, the example embodiments are not limited thereto and other methods may be utilized in order to determine rankings of videos, sections of the videos, highlight images, and/or comments.

The server 150 may extract a highlight image by clustering accumulation information, for example, a number of iterative playbacks, a number of captures, a number of shares, etc., associated with a video for each cluster. For example, the server 150 may classify users into a plurality of groups based on an age, a gender, a location, etc., may collect accumulation information associated with a video for each group, and may extract a highlight image based on a preferred section of each group. Accordingly, the server 150 may recommend a different highlight image based on a group of a user although the same content of the video is consumed.

Also, the server 150 may measure a preference for a video based on user feedback information about a comment of the video or accumulation information, for example, a number of iterative playbacks, a number of captures, a number of shares, etc., associated with the video. The server 150 may measure a preference for each cluster and may recommend a video preferred by a corresponding cluster to users of each cluster. Here, the preference may be verified based on an amount of time, for example, 10 seconds or more, used for the user to view a corresponding section after selecting the video or the section in the video. Here, a method of recommending content preferred by another user having a similar taste through similarity comparison between users, a method of recommending content having a similar attribute to an item most preferred by a user, a method of recommending content by applying a weight based on a common element, such as weather, a geographic location, a time zone, a time of day, a time of year, etc., that effects a feeling of a user, a method of recommending content of a most recent item preferred by users, and the like, may be employed to recommend a video.

According to some example embodiments, it is possible to support a comment service improved and/or optimized for a video by extracting a partial section selected by a user from video content and by registering the extracted partial section and a user input (such as text, etc.) in comment form. Also, according to some example embodiments, it is possible to extract a highlight image from a video based on an action of a user directly consuming the video and to automate extraction of the highlight image from the video by extracting the highlight image using a partial section registered in a form of a comment embedded in the video or by extracting the highlight image based on accumulation information of a section played back by users in the video. Also, according to some example embodiments, it is possible to enhance the popularity, attraction power of content and the immersion of a user by providing a preview of a highlight image with respect to a video included in a content list, and to decrease the amount of data transmitted compared to providing a full image for verifying the content. Further, it is possible to verify the content in a low specification network environment. Also, according to some example embodiments, it is possible to consecutively verify content without using a list-based selection process by providing a continue-to-view from an end of a full image or a highlight image of a video to another video. Further, since a list-image switch is not required, it is possible to provide a quality of service (QoS) suitable for the video.

While various example embodiments have been disclosed herein as utilizing video content, the example embodiments are not limited thereto and other forms of content may be used in addition and/or instead of video. For example, music (e.g., audio), text (e.g., writing, articles, books, stories, etc.), art (e.g., pictures, images, photos, comics, etc.), websites, etc., may also be used in connection with the example embodiments.

The units described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described.

The same may also be varied in many ways. Such variations are not to be regarded as a departure from the disclosure, and all such modifications are intended to be included within the scope of the disclosure.

What is claimed is:

1. A non-transitory computer-readable medium comprising computer readable instructions, which when executed by at least one processor, cause the at least one processor to:
   transmit video content to a first client electronic device;
   receive a selection of a partial section of the video content from the first client electronic device, the partial section of the video content corresponding to a subset of a full version of the video content;
   extract a first highlight image from the video content, the first highlight image corresponding to the partial section, the first highlight image being video corresponding to the partial section;
   store the first highlight, image in association with the video content;
   transmit the first highlight image along with an embedded comment associated with the video content to a second client electronic device;
   receive an input event corresponding to a content switch gesture from the second client electronic device, the content switch gesture indicating a switch from playing of the first highlight image to playing of the full version of the video content;
   transmit the video content to the second client electronic device as a full version of the first highlight image in response to the input event; and
   extract a third highlight image from the video content based on accumulation information regarding at least one of,
      an iterative section of the video content, the iterative section being a section of the video content that has been played back using a rewind function,
      a captured section of the video content, the captured section being a section of the video content that has been recorded, or
      a shared section of the video content, the shared section being a section of the video content that has been shared by at least one client electronic device.

2. The non-transitory computer-readable medium of claim 1, wherein
   the receiving the selection of the partial section of the video content includes receiving an indication of the selection and a text input; and
   the storing the first highlight image includes storing the video corresponding to the partial section and text of the text input, the text being the embedded comment.

3. The non-transitory computer-readable medium of claim 1, wherein the at least one processor is further caused to:
   transmit at least one highlight image associated with a second video content to the second client electronic device in response to receiving a second input event.

4. The non-transitory computer-readable medium of claim 1, wherein the at least one processor is further caused to:
   transmit a content list including a list of a plurality of video content, including the video content, to the second client electronic device; and wherein
   the transmitting of the content list includes transmitting a preview of at least one highlight image associated with each of the plurality of video content from the content list.

5. The non-transitory computer-readable medium of claim 4, wherein the at least one processor is further caused to:
   analyze the plurality of video content associated with the content list;
   determine a partial section of each of the plurality of video content related to a video category associated with the content list; and
   generate the at least one highlight image associated with each of the plurality of video content for the video category based on the determined partial section.

6. The non-transitory computer-readable medium of claim 5, wherein the at least one processor is further caused to analyze the plurality of video content by:
   analyzing action, music, or dialogue of partial sections of each of the plurality of video content for relevance to the video category.

7. The non-transitory computer-readable medium of claim 1, wherein the at least one processor is further caused to:
   determine a second highlight image associated with the video content based on user feedback information related to the first highlight image transmitted along with the embedded comment.

8. An apparatus comprising:
   a memory having computer readable instructions stored thereon; and
   at least one processor configured to execute the computer readable instructions to,
      transmit video content to a first client electronic device,
      receive a selection of a partial section of the video content from the first client electronic device, the partial section of the video content corresponding to a subset of a full version of the video content,
      extract a first highlight image from the video content, the first highlight image corresponding to the partial section, the first highlight image being video corresponding to the partial section,
      store the first highlight image in association with the video content,
      transmit the first highlight image along with an embedded comment associated with the video content to a second client electronic device,
      receive an input event corresponding to a content switch gesture from the second client electronic device, the content switch gesture indicating a switch from playing of the first highlight image to playing of the full version of the video content,
      transmit the video content to the second client electronic device as a full version of the first highlight image in response to the input event, and
      extract a third highlight image from the video content based on accumulation information regarding at least one of,
         an iterative section of the video content, the iterative section being a section of the video content that has been played back using a rewind function,
         a captured section of the video content, the captured section being a section of the video content that has been recorded, or
         a shared section of the video content, the shared section being a section of the video content that has been shared by at least one client electronic device.

9. The apparatus of claim 8, wherein the at least one processor is further configured to:
   receive the selection by receiving an indication of the selection and a text input; and
   store the first highlight image by storing the video corresponding to the partial section and text of the text input, the text being the embedded comment.

10. The apparatus of claim 8, wherein the at least one processor is further configured to:

transmit at least one highlight image associated with a second video content to the second client electronic device in response to the received input event.

11. The apparatus of claim 8, wherein the at least one processor is further configured to:

transmit a content list including a list of a plurality of video content, including the video content, to the second client electronic device, and the transmitting the content list includes transmitting a preview of at least one highlight image associated with each of the plurality of video content from the content list.

12. The apparatus of claim 11, wherein the at least one processor is further configured to:

analyze the plurality of video content associated with the content list;

determine a partial section of each of the plurality of video content related to a video category associated with the content list; and generate the at least one highlight image associated with each of the plurality of video content for the video category based on the determined partial section.

13. The apparatus of claim 12, wherein the at least one processor is further configured to analyze the plurality of video content by:

analyzing action, music, or dialogue of partial sections of each of the plurality of video content for relevance to the video category.

14. The apparatus of claim 8, wherein the at least one processor is further configured to:

configure the stored partial section using an index for connecting to a playback section of the video content; and wherein the transmitting the stored first highlight image includes transmitting the configured partial section.

15. The apparatus of claim 8, wherein the at least one processor is further configured to:

determine a second highlight image associated with the video content based on user feedback information related to the first highlight image transmitted along with the embedded comment.

\* \* \* \* \*